United States Patent Office 3,801,558
Patented Apr. 2, 1974

3,801,558
OLEFIN POLYMERIZATION
Kenneth L. Fletcher, Lancs, and Robert N. Haward, Cheshire, England, assignors to Shell Oil Company, New York, N.Y.
No Drawing. Filed Sept. 30, 1971, Ser. No. 188,703
Int. Cl. C08f 1/56, 3/06
U.S. Cl. 260—88.2 R           10 Claims

ABSTRACT OF THE DISCLOSURE

Olefin polymer is produced by polymerizing alpha-olefins of 2 to 8 carbon atoms with a Ziegler type catalyst comprising (a) a transition metal component produced by reacting a transition metal compound in its highest valence state with a reducing organomagnesium compound produced by reacting magnesium metal and a hydrocarbyl halide in the presence of a hydrocarbon solvent and a complexing agent for the organomagnesium compound and (b) an organoaluminum compound.

BACKGROUND OF THE INVENTION

The present invention relates to the polymerization of olefins with the aid of catalysts of the kind known in the art as Ziegler catalysts.

As is well known, a Ziegler catalyst system may be formed by bringing together a transition metal compound in which the transition metal is in a valence state below the normal maximum, for example, titanium trichloride and an activator which is an organometallic compound, for example, an aluminum alkyl. The transition metal compound is conveniently formed by reducing a transition metal compound in which the transition metal is in the normal maximum valence state with an organometallic compound as the reducing agent; the same or different organometallic compound may be used as the activator. Normally, the reduction step is carried out by bringing together solutions, in an inert organic solvent such as hydrocarbon, of the transition metal compound and the organometallic reducing agent. Olefin polymerization may be carried out with the aid of a Ziegler catalyst system using a reaction medium comprising an inert organic liquid, for example, an aliphatic hydrocarbon and said catalyst system, one or more olefins being brought into contact therewith in any suitable manner. A molecular weight regulator, such as hydrogen, is usually present in the reaction vessel in order to suppress formation of undesirably high molecular weight polymer. Normally, fresh activator is fed to the polymerization reactor continuously or from time to time in order to maintain the activity of the catalyst system. Many forms of Ziegler catalyst have been proposed and, as is now well known in the art, there are many transition metal compounds and organometallic compounds which may be used to form Ziegler catalyst systems.

For obvious economic reasons it is desirable that a Ziegler catalyst system should have a high catalytic activity. Appreciable improvements in catalytic activity of Ziegler catalyst may be obtained by using an organomagnesium compound as the reducing agent. See, for example, Belgium Pats. Nos. 744,470 and 744,471 of Haward et al. and U.S. 3,392,159 of Schooley et al. The Ziegler catalysts of these patents may be referred to for convenience as "magnesium-reduced catalysts." Many types of organomagnesium compounds may be used as reducing agents in preparing magnesium-reduced catalysts, but for convenience it is generally preferred to use compounds of the type resulting from reaction between an organohalide of formula RX (wherein R represents a hydrocarbyl group and X a halogen atom) and magnesium metal. The term "Grignard reagent" may be used to refer to compounds of this type.

SUMMARY OF THE INVENTION

Surprisingly, it has now been found in accordance with the present invention that unexpected advantages can arise if the reducing agent used in preparing a magnesium-reduced catalyst is an organomagnesium Grignard reagent prepared in a hydrocarbon solvent medium containing a controlled amount of a complexing agent for said Grignard reagent such, for example, as a dialkyl ether.

Accordingly, the present invention provides a process for preparing olefin polymers which comprises contacting an olefin monomer with a catalyst composition, prepared by reducing a transition metal compound in its normal maximum valency state with a complexed organomagnesium halide, formed by reacting an organo halide with magnesium in a liquid medium comprising a hydrocarbon solvent and a complexing agent for the organmagnesium halide, and an organometallic activator.

DESCRIPTION OF PREFERRED EMBODIMENTS

The complexing agent: Without wishing to be limited in any way by theoretical consideration it is noted that the use of the complexing agent in the preparation of the Grignard reagent may exert a dual influence. One such influence is in regard to the physical characteristics of the solution of the organomagnesium reducing agent. Preparation of the Grignard reagent in a hydrocarbon solvent medium usually results in a Grignard reagent which is only partially soluble in the solvent at elevated temperatures. This can be a serious disadvantage not only in the normal handling thereof, including the filtration step necessary for the removal of any unreacted magnesium and insoluble magnesium halide by-product, but also in the subsequent use of the solution in the reduction of the transition metal compound since it has been found advantageous to carry this out at ambient temperatures, for example, up to 30° C., e.g. between 10 and 30° C.

Surprisingly, it has been found that the presence of a complexing agent may render the Grignard reagent soluble in hydrocarbon solvents at ambient temperature, and also that the viscosity of the resulting solution may be appreciably lower than would be anticipated from the viscosities of solutions (at elevated temperatures) of the uncomplexed Grignard reagents in hydrocarbon solvents. The solubilities of the resulting complexed Grignard reagents may depend on the particular complexing agent used, and in fact some complexing agents, for example, aromatic ethers such as phenyl methyl ether and aromatic amines such as triphenylamine do not yield highly soluble complexes. Consequently, routine trial may be necessary to determine the suitability of a complexing agent from the solubilizing point of view and solubility is an advantage in a filtration operation. Alternatively, certain ether or amine complexes may be in a viscous solution or slurry form and advantageously used in this form.

The other influence the complexing agent may have is in regard to the catalytic activity of the resulting Ziegler catalyst system. If the complexnig agent is used in a minor, controlled amount in relation to organomagnesium compound, the resulting catalyst system can have a desirably high activity in terms of the amount of olefin polymerized per hour per unit weight of catalyst. The reason for this enhancement of activity is not at present understood, although it appears to be critically dependent on the amount of complexing agent used and that as the amount increases above about the equimolar proportion with respect to the organomagnesium compound the activity of the ultimate catalyst can decrease.

Among the various organic compounds which may be used as complexing agents in carrying out the present invention, the aliphatic and cycloaliphatic ethers of 2 to 20 carbon atoms, for example, the straight chain ethers, i.e., di-n-alkyl ethers of 2 to 10 carbon atoms such as diethyl ether, dibutyl ether, and, for example, cycloalkyl ethers of 5 to 6 carbon atoms such as tetrahydrofuran and tetrahydropyran have given good results and may be singled out for special mention. However, other organic compounds, for example, tertiary alkyl amines of 3 to 20 carbon atoms which will complex with, but not react with, Grignard reagents may also be used. As previously indicated some complexing agents are more effective than others; thus, although, for example, other lower alkyl ethers may be used, di-n-butyl ether is convenient from the point of view of its boiling point, hydrocarbon miscibility properties and commercial availability, and is accordingly preferred. Ethers and tertiary amines which have molecular structures such that they are not sterically hindered from complexing with organomagnesium halides particularly hydrocarbyl magnesium halides in hydrocarbon-containing liquid media may be preferred in carrying out the present invention, Preferred non-sterically hindered ethers and amines are di-n-alkyl ethers and tertiary n-alkyl amines.

There are indications that the reduced transition metal compounds produced in accordance with the present invention contain both magnesium halide and complexing agent in the crystal lattice or macrostructure of the compounds, and it is possible that this may contribute to the success of these compounds as olefin polymerization catalysts.

As already indicated the amount of complexing agent such as an ether which is used is critical to the extent that sufficient ether should be used to ensure the required solubility of the Grignard reagent in the hydrocarbon solvent employed, the upper limit usually being dictated by the need to achieve maximum catalytic activity in the ultimate catalyst system. For example, when the Grignard reagent is butyl magnesium chloride, and approximately equimolar amount of dibutyl ether and butyl magnesium chloride product has given good results. Somewhat less dibutyl ether has also been used to advantage, but it was found that when the proportion was dropped to about 0.7 mol of ether per mol of butyl magnesium chloride product the latter tended to become less soluble in the hydrocarbon solvent used (which was iso-octane) to the extent that slight precipitation was observed on standing from 1-2 days at ambient temperature. On the other hand, it was found that when the proportion of ether was increased to 2 mols of ether per mol of butyl magnesium chloride product a small decline in the polymerization activity of the resulting catalyst occurred. In general, a complexing agent Grignard reagent mol ratio between 0.5 and 2.5 should be aimed at, preference being given to mol ratio between 0.8 and 1.5 and most preference being given to about equimolar proportions.

The Grignard reagent: Many types of organomagnesium compounds may be used as the reducing agent in the reduction of transition metal compounds according to the present invention, but for convenience it is generally preferred to use compounds of the type resulting from reaction between an organohalide of formula RX (wherein R represents a hydrocarbyl group and X represents a halogen atom) and magnesium metal. The term "Grignard reagent" is often used to refer to compounds of this type, and for convenience this term is used in the present specification. It should be noted, however, that although the term "Grignard reagent" is sometimes used in a narrow sense to denote the etherated organomagnesium halides resulting from effecting the above reaction in an ether solvent medium, the term is used herein in its broadest sense to denote any type of organomagnesium compound resulting from the above general reaction. Thus, "Grignard reagent" as used herein includes hydrocarbylmagnesium halides of formula RMgX (optionally solvated), dihydrocarbyl magnesium compounds of formula $R_2Mg$ and compounds of the formula $$(R_2Mg)_a(RMgX)_{1-a}$$

together with compounds of these formulae obtained when carrying out the Grignard reaction in an inert (i.e., non-solvating) solvent such as hydrocarbon. The term "hydrocarbyl" used herein includes alkyl, aryl, cycloalkyl, alkaryl, aralkyl and alkenyl. Compounds where X represents a chlorine or bromine atom are preferred, but compounds wherein X represents an iodine atom can also be used.

Optimum activity in the final activated catalyst is generally obtained by using a Grignard compound in which R represents an alkyl group of from 4 to 16 carbon atoms, preferably at least 8 and most suitably 12 carbon atoms. However, the higher alkyl Grignard compounds are usually more expensive; hence the final choice of Grignard alkyl is usually based on an evaluation of economics, convenience and effectiveness.

It may be advantageous to effect preparation of the Grignard reagents of the present invention under reactant concentration conditions such that the Grignard reagent is formed in a concentration above about 100 millimoles thereof per liter of reaction medium. This may be because as the concentration thereof decreases the tendency of the complexed Grignard reagents to dissociate irreversibly may become a factor which needs to be taken into account.

Advantageously, a hydrocarbyl halide, e.g., alkyl halide, may be added as a solution in said reaction medium gradully to finely-divided magnesium metal; and the reaction temperature may be between 80 and 120° C., for example, about 100° C. After completion of the reaction, the reaction mixture may be filtered, decanted or centrifuged to remove by-product solid magnesium halide and any unrecated magnesium.

Throughout this specification, where reference is made to "Grignard reagent" it is to be understood that the term denotes the product formed by reacting together magnesium metal and a hydrocarbyl halide, irrespective of whether the product is utilized in the reaction slurry or is separated by solvent extraction from the insoluble components of the reaction slurry. Where reference to the latter type of product is specifically intended the term "Grignard solution" is employed.

The transition metal compound: Any transition metal compound or mixtures thereof which can be reduced by an organomagnesium compound from its normal maximum valence state to a lower valence compound which can function as an olefin polymerization catalyst in the presence of an organometallic activator may be used in carrying out the present invention.

Well known from numerous patents and publications to be suitable metal compounds are compounds of transition metals of groups 4b, 5b, 6b, or 8 of the Periodic Table of the Elements (as illustrated on pages 448 and 449, Handbook of Physics and Chemistry, The Chemical Rubber Publishing Corp. 44th edition, 1962) and particularly the halides, preferably chlorides, of titanium, vanadium, zirconium and compounds of chromium and molybdenum. The most preferred Ziegler catalysts of the invention are those obtained by reducing titanium tetrachloride with the organomagnesium complex and activating the resulting titanium trichloride with the organometallic activator.

The organometallic activator: Any known or suitable organometallic activator may be used. For example, this may be an aluminum trialkyl wherein each alkyl group has up to 16 carbon atoms, preference being given to, for example, aluminum triethyl, aluminum tri-n-propyl and tri-isopropyl, aluminum tri-isobutyl, aluminum tri-n-hexyl, aluminum tri-octyl, aluminum tri-undecyl, aluminum tri-octadecyl, aluminum tri-hexadecyl and mixed aluminum trialkyls.

A particularly effective activator for an organomagnesium reduced catalyst may be obtained by reacting the aluminum trialkyl having alkyl groups containing 1 to 6 carbon atoms, with up to a substantially equimolar amount of water in the presence of an inert liquid diluent such as a hydrocarbon in which the concentration of aluminum trialkyl preferably does not exceed that of a one molar solution.

The term "substantially an equimolar amount" is used herein to permit the equimolar proportion to be exceeded by a small amount such that the activity of the resulting catalyst is not less than it would be if the amount of water used were 0.25 mole per mole of aluminum trialkyl. The permissible slight excess which may be tolerated may depend on the particular aluminum trialkyl used, and it may be determined readily by trial. By way of explanation it is noted that the decline in activity resulting from the use of water in excess of an equimolar proportion appears to be very rapid, and it is for this reason that the above definition of the upper water limit has been adopted.

In carrying out the water treatment it is important to ensure the amount of water does not exceed substantially an equimolar amount with respect to the aluminum trialkyl; preferably it is between 0.25 and 1.0 moles per mole thereof. It is also important to ensure that it is the aluminum trialkyl which is reacted with the water and not the catalyst or the combination of catalyst and activator since in the two latter instances water has a de-activating effect; it follows that water treatment of the aluminum trialkyl should be complete before the treated alkyl comes into contact with the catalyst since any free water brought in with the trialkyl will adversely affect the catalyst. Also, the aluminum trialkyl is preferably used as a catalyst activator as soon as possible after said water treatment and preferably within 1 hour and advantageously within ¼ to ½ hour thereof.

The water treatment may be carried out by adding a wet liquid hydrocarbon to a solution of the aluminum trialkyl in the same or different hydrocarbon with agitation or turbulence sufficient to achieve adequate mixing. For example, the two components may be brought together as liquid streams, one being injected into the other to provide the necessary turbulence, and the resulting mixture may be supplied to the polymerization reactor after allowing adequate time for completion of the reaction between the water and the trialkyl. Polymerization in accordance with the present modification is preferably carried out continuously, said mixing being supplied continuously to the polymerization reactor as the source of fresh activator and fresh solvent therefor.

The aluminum alkyls which after water treatment in accordance with the present invention can be used as catalyst activators include the lower alkyls up to aluminum tri-octyl, the preferred alkyl being aluminum triethyl.

Without wishing to be limited in any way by theoretical considerations, it is believed that the reaction of a controlled amount of water with an aluminum trialkyl can lead under dilute solution conditions to the formation of an intermediate which has characteristics combining the advantageous activating ability of a short chain aluminum trialkyl with the advantageous slower rate of cativity decay possessed by a long chain aluminum trialkyl. This unexpected combination appears to be responsible for the significantly increased polymerization rate achievable in accordance with the present invention, and the invention provides a significant technical advance in the area of magnesium-reduced Ziegler catalysts by providing alternative activators to the long chain aluminum trialkyl which, although technically attractive activators for magnesium-reduced catalysts, are expensive chemicals to manufacture. It is believed that the advantageous intermediate which may be formed could be a compound of the molecular formula: $AlR_2OH$, in which each R represents the same or different alkyl group. In such case the present modification may be said to provide an olefin polymerization process in which an olefinic monomer is polymerized with the aid of a magnesium-reduced Ziegler catalyst activated by a compound: $AlR_2OH$ as just defined. It is believed that compounds of the molecular formula. $AlR_2OH$ are chemically unstable to the extent of being readily convertible under favorable conditions into compounds which do not show activity or any significant activity when in combination with magnesium-reduced catalysts. The present process avoids such unfavorable conditions by effecting the reaction with water under very dilute alkyl/water conditions, by ensuring that the water is homogeneously distributed in a liquid hydrocarbon solvent when it contacts the aluminum trialkyl, and by limiting the period between the water treatment and the subsequent use of the treated alkyl as a catalyst activator, for example, to less than an hour.

Reduction reaction conditions: The Grignard reagent of the present invention may be reacted with, for example, titanium tetrachloride in any known or suitable procedure for the reduction of this compound to titanium trichloride, but it has been found convenient to react the Grignard reagent with a solution of titanium tetrachloride dissolved in the same hydrocarbon solvent as that used in the preparation of the Grignard reagent. These reactants may be brought together in any sequence; for example, the so-called "reverse addition" technique in which the titanium tetrachloride is added to the Grignard reagent may be used; "reverse addition" may be preferred from the point of view of the polymer bulk density achieved. The concentration of the Grignard reagent and the concentration of the titanium tetrachloride solution can be varied to suit particular operational requirements, but the use of too large an excess of Grignard reagent carries with it the danger of over reduction to titanium in the divalent state and should be avoided. Accordingly, it is preferred that the molar ratio of Grignard reagent to titanium tetrachloride should not exceed 3:1, while advantageous results normally may be attained with a ratio between 1:2 and 2:1.

The temperature at which the Grignard reducing compound and titanium tetrachloride are reacted may be important from the point of view of the physical form and activity of the final catalyst, and also the physical properties of the polymer product. In general any reduction temperature between −80° C. and +100° C. may be used, although temperatures of the order of ambient temperature are preferred.

The olefin monomers: The present invention is particularly applicable to ethylene polymerization or co-polymerization of ethylene with 1-olefinic monomers which are capable of polymerization with the aid of a Ziegler catalyst of the kind referred to herein, for example, propylene, butene-1, hexene-1, etc., to produce copolymers containing a minor proportion of the higher 1-olefin. However, the catalyst of the invention may also be employed in the polymerizations of alpha-monoolefins of 3 to 8 carbon atoms, preferably, 3 to 6 carbon atoms.

Polymerization reaction condition: The actual polymerization procedure may be carried out in accordance with any known or suitable techniques employed in the Ziegler polymerization art. In general, a suspension of the catalyst in a hydrocarbon solvent is charged, together with an amount of activator, into a polymerization vessel, which is then fed with the olefin monomer (or monomers if a copolymer is to be produced) and usually also with hydrogen as a molecular weight regulator. The catalyst and activator may be fed separately to the vessel or they may be mixed together prior to entering it. The polymerization reaciton may be carried out under any convenient pressure, though yields tend to diminish as the pressure approaches atmospheric pressure, while the equipment costs become high if very high pressures are used. Accordingly, it is preferred to carry out the polymerization with the catalyst of this invention at superatmospheric pressure, preferably below 100 atmospheres and conveniently, at about 50–200 p.s.i.g.

The polymerization normally takes place in an inert liquid medium. Particularly suitable as solvents or diluents are hydrocarbons and halogenated hydrocarbons, the choice being wider than during the reduction process. The hydrocarbons are preferably aliphatic, saturated hydrocarbons but may also be cycloaliphatic or aromatic compounds, or mixtures of such compounds.

The concentration of titanium compound during the polymerization may be between 0.005 and 10 and preferably between 0.2 and 0.25 milliatoms of Ti per liter.

Temperatures during the polymerization are as a rule between 0° C. and 150° C., preferably between 50° C. and 70° C. in the production of polyethylene.

Polymerization may be batch or continuous or may be carried out utilizing the multi-stage technique. In the multi-stage technique, the process of the present invention is carried out in two sequential polymerization zones, the polymerization conditions in each zone may be controlled in accordance with the requirements for the simultaneous production of olefin polymers of appreciably different molecular weights in said zones. By using the same catalyst in both zones a sequential growth of polymer chains of different chain lengths (depending on the polymerization conditions subsisting in a zone) appear to take place in close proximity on the catalyst particles and this results in a degree of homogeneity in the polymer product which suprisingly cannot be obtained by the physical admixture of two individual polymer-containing reaction slurries (i.e., polymer suspensions in liquid media resulting from separate Ziegler polymerizations carried out under conditions leading to olefin polymers of appreciably different molecular weights), since it has been found that the ultimate polymer product obtained on working up such admixed reaction slurries exhibits unacceptable macro-inhomogeneity. The use of the multistage technique for Ziegler polymerization is disclosed in U.S. 3,392,213 of Berger.

Olefin or hydrogen pretreatment: Although olefin polymerization using the catalyst compositions of the invention is frequently carried out by simultaneous addition of olefin e.g., ethylene and chain regular e.g., hydrogen, if a polymer of broader molecular weight is required, advantageous for extrusion molding, the catalyst composition may be pretreated with an olefin.

Alternatively if a polymer of narrower molecular weight distribution is required, advantageous for injection molding, the catalyst composition may be pretreated with hydrogen.

The pretreatment of the present process using an olefin or hydrogen may be carried out in various ways. The catalyst, a suitable transition metal compound in which the transition metal is in a valence state below its normal maximum, activated by an organometallic activator, may be prepared in the presence of the pretreating olefin or hydrogen. Alternatively, the catalyst composition may be contacted with the olefin or hydrogen immediately after its preparation, i.e., with the minimum delay having regard to practical considerations in order to arrest the decay of active sites as soon as possible. It is important to carry out the pretreatment with olefins in the substantial absence of hydrogen. The required contact with the olefin may be achieved in the gaseous phase with the catalyst in a fluidized state using a fluidized bed technique, of said contact may be achieved in a liquid phase with the catalyst dispersed in an inert organic liquid, for example, an aliphatic hydrocarbon. The pretreatment technique using hydrogen is similar to that using an olefin insofar that the titanium trichloride and the organometallic compound may be brought together in the presence of hydrogen or the hydrogen may be contacted with the catalyst immediately after its preparation. Similarly, the pretreatment with hydrogen should be carried out in the substantial absence of olefin.

When the catalyst is pretreated with an olefin, the olefin need be in contact with the catalyst for only the short period required for preservation of its active sites as indicated by improved activity, and normally this contact period will not greatly exceed the minimum required in order to limit the amount of polyolefin formed in the pretreatment, e.g., up to 120 secs., preferably up to 60 secs. and especially 10–50 secs. The temperature of pretreatment may vary considerably but pretreatment with the range 40–140° C. has been found suitable. For example, by addition to a suspension in a liquid hydrocarbon of freshly-made titanium trichloride/aluminum triethyl catalyst system of ethylene over a period of 30 seconds at 80° C. and a pressure rising to 50 p.s.i.g. (pounds per square inch, gauge) by the end of this period one can produce a highly active catalyst for use in a subsequent ethylene polymerization in which hydrogen is present. Ethylene pretreatment conditions, particularly time, may be selected so that the amount of high molecular weight polyethylene formed in the pretreatment is insufficient to cause compatability problems, and so that the resulting polyethylene gives a homogeneous film on extrusion.

Pretreatment in accordance with the present process using olefins may be carried out at any suitable pressure, for example, under pressures of 25 to 100 p.s.i.g. or more. Pretreatment at elevated temperatures, for example, at 50° C. to 90° C. may be preferred, but in general any temperature at which the catalyst is an active polymerization catalyst for the olefin when used in the pretreatment may be employed providing the temperature is not so high as to destroy the catalyst or to modify it in an undesirable manner. For example, ethylene pretreatment of a titanium trichloride/aluminum triethyl catalyst at a catalyst concentration of up to 0.5 millimole, for example, of the order of 0.01 to 0.1 millimole of $TiCl_3$ per liter of liquid hydrocarbon diluent can give advantageous results when carried out at 50° C. to 90° C. for periods of 10 to 60 seconds. Pretreatment may be carried out in a vessel which is small in relation to the subsequent polymerization vessel(s), and no limitation is placed on the pressure or temperature relationship between the pretreatment and the subsequent polymerization, and polymerization may be carried out at the same pressure or temperature as pretreatment or at a higher or lower pressure or temperature than pretreatment.

Although ethylene pretreatment effectively broadens the molecular weight of the polymer, a similar effect is achieved wherein a lower polymerization temperature is employed e.g., 45 to 65° C. especially 50–60° C.

The present invention may be illustrated by reference to the following examples in which a number of Grignard reagents A, B, C, and D each prepared under different reaction conditions, were used to prepare a number of magnesium-reduced Ziegler titanium catalysts designated F to K. These catalysts were used to catalyze ethylene polymerization both batchwise at atmospheric pressure, and at 100 pounds per square inch (6.9 bars) gauge pressure, and continuously. In order to provide comparative data showing the disadvantages of preparing the Grignard reagent in the presence of ether alone, i.e., the classical method of preparing Grignard reagents in preparative chemistry, Grignard reagent A was prepared using di-n-butyl ether as the sole solvent.

The various Grignard reagents were prepared in the following manner:

Grignard reagent A

A solution of 92.5 grams of butyl chloride (0.1 mole) dissolved in 780 grams of di-n-butyl ether (6.0 moles) was added slowly to 26.8 grams of dry magnesium powder (1.1 gram/atoms) over a period of 1 hour, the reaction mixture being maintained at 100° C. After cooling to room temperature, unreacted magnesium powder and by-product insoluble magnesium chloride were removed by filtering through a sintered glass filter. This produced a solution containing 0.828 mole/liter of butyl magnesium chloride, which corresponds to a yield of 91.2%. The ratio of di-n-butyl ether:BuMgCl was 6.6:1 (wherein Bu is butyl).

Grignard reagent B

A solution of 209.4 milliliters of n-butyl chloride (2 moles) dissolved in a mixture of 666 milliliters of di-n-butyl ether (4.0 moles) and 1126 milliliters of iso-octane, was added slowly to 52.8 grams of dry magnesium powder (2.2 grams/atoms). The reaction was performed at 100° C. and the solution of butyl chloride was added over a period of 1½ hours. The products of the reaction were cooled slowly to ambient temperature and filtered through a sintered filter. This reaction gave a yield of 86% of an entirely soluble Grignard reagent. The ratio of di-n-butyl ether:BuMgCl was 2.3:1.

Grignard reagent C

A solution of 209.4 milliliters of n-butyl chloride (2.0 moles) dissolved in a mixture of 333 milliliters of di-n-butyl ether (2.0 moles) and 1457 milliliters of iso-octane, was added slowly to 52.8 grams of dry magnesium powder (2.2 gram/atoms). The reaction was performed at 100° C. and the solution of butyl chloride was added over a period of 95 minutes. Analysis of the hydrocarbon solution, after cooling to ambient temperature and filtering through a sintered glass filter to remove unreacted magnesium powder and by-product magnesium chloride, indicated an 86% yield of BuMgCl. The ratio of di-n-butyl ether:BuMgCl was 1.2:1.

Grignard reagent D

A solution of 209.4 milliliters of n-butyl chloride (2.0 moles) dissolved in a mixture of 250 milliliters of di-n-butyl ether (1.5 moles) and 1540 milliliters of iso-octane was added slowly to 52.8 grams dry magnesium powder (2.2 gram atoms). The reaction was performed at 100° C. and the solution of butyl chloride was added over a period of 95 minutes. The reaction mixture was slowly cooled to ambient temperature and filtered through a sintered glass filter to remove unreacted magnesium powder and by-product magnesium chloride. The yield of soluble Grignard reagent was 85%. The ratio of di-n-butyl ether:BuMgCl was 0.88:1.

Grignard reagent E

A solution of 209.4 milliliters of n-butyl chloride (2.0 moles) dissolved in a mixture of 166.4 milliliters of di-n-butyl ether (1.0 moles) and 1623.0 milliliters of iso-octane, was added slowly to 52.8 grams of dry magnesium powder (2.2 gram atoms). The reaction was performed at 100° C. and the solution of butyl chloride was added over a period of 95 minutes. The reaction mixture was cooled slowly to ambient temperature and filtered through a sintered glass filter. The yield of soluble Grignard reagent was 71%. Ratio of di-n-butyl ether:BuMgCl 0.70:1.

EXAMPLE I

A titanium trichloride catalyst component was prepared at −60° C. using Grignard Reagent A as the reducing agent by adding a solution of 0.45 milliliters (4.15 mmoles) of $TiCl_4$ dissolved in 50 milliliters of dry iso-octane slowly over a period of 30 minutes to 10 milliliters (8.28 mmoles) of Grignard reagent A dissolved in 90 milliliters of iso-octane. The reduction was performed in a cylindrically shaped vessel with a turbine agitator, the reaction mixture therein being maintained at −60° C. The titanium tetrachloride was added to the solution of the Grignard reagent over a period of 30 minutes with a stirring speed of 600 r.p.m. The resulting catalyst suspension was then stirred for a further 3 hours while its temperature rose slowly to ambient temperature. The resulting catalyst component was designated "Catalyst F."

EXAMPLE II

A titanium trichloride catalyst component was prepared using Grignard Reagent A under exactly the same conditions of catalyst F with the exception that the reduction was performed at +23° C. This catalyst component was designated "Catalyst G."

EXAMPLE III

Grignard reagents B, C, D and E were used to prepare different titanium trichloride catalyst components (designated H to G) under the following conditions in each case:

A solution of 125 millimoles of $TiCl_4$ (dissolved in sufficient iso-octane to give a concentration of 2000 millimoles/liter) was added slowly to 187.5 millimoles of the respective Grignard Reagent in iso-octane. The reduction was performed in a cylindrically shaped vessel fitted with a turbine agitator (stirring speed 500 r.p.m.) at 23° C. The addition period was 30 minutes and stirring was continued for a further 3 hours.

Grignard reagent B was used to produce catalyst H
Grignard reagent C was used to produce catalyst I
Grignard reagent D was used to produce catalyst J
Grignard reagent E was used to produce catalyst K
Grignard reagent A was used to produce catalyst F
Grignard reagent A was used to produce catalyst G

EXAMPLE IV

In order to test the various catalyst components prepared in accordance with Examples I to III a number of different ethylene polymerizations were carried out using one or other of the following procedures:

(a) Batch polymerizations at atmospheric pressure

The polymerization reactor consisted of a dry 5 liter three-necked flask fitted with a thermometer, a stirrer, a gas inlet dip tube and a condenser; the flask was located in a constant temperature bath. The reactor was filled with dry nitrogen and then charged with 3 liters of iso-octane solvent. This solvent was saturated with a mixture of ethylene and hydrogen, and polymerization was initiated by the addition of the catalyst component and aluminum tri-octyl as the activator therefor. Polymerization was performed under the following conditions:

Catalyst system: 0.1 mmole/liter of $TiCl_3$, activated by 1.0 mmole/liter of $AlOct_3$
Temperature: 80° C.
Polymerization time: 3 hours
Ethylene/hydrogen ratio: 50/50 v./v.
Rate of gas supply (ethylene and hydrogen): 200 liters per hour
Stirring speed: 450 r.p.m.

(b) Batch polymerization at 100 p.s.i. (6.9 bars) gauge pressure

Polymerization was performed in a 1 gallon stainless steel autoclave fitted with a magnetically driven stirrer. The vessel was dried and purged with dry nitrogen before the start of the polymerization. Two liters of iso-octane solvent, and the required amounts of activator ($AlOct_3$) and $TiCl_3$ catalyst component were added to the vessel and the polymerization was initiated by the addition of hydrogen and ethylene in that order.

Ethylene was automatically fed to the reactor on demand to keep the pressure constant at 6.9 bars gauge. Polymerization was performed under the following conditions:

Catalyst system: 0.05 moles/liter of $TiCl_3$ and 0.5 mmoles/liter of $AlOct_3$
Polymerization temperature: 80° C.
Polymerization time: 3 hours
Ratio of ethylene: hydrogen equals 50:50 v./v.

The iso-octane solvent used in both the above batch polymerizations was purified to remove traces of oxygen and water by "sparging" with 200 liters of dry nitrogen at 80° C.

(c) Continuous polymerization

Continuous polymerization was performed under the following conditions in a 10 gallon reactor provided with a gas recycling system by means of which "cap gas" in the reactor was constantly removed and returned, with fresh make-up ethylene, to the sparger inlet from which it bubbled out through the reaction mixture.

Polymerization temperature: 85° C.
Reactor pressure: 6.9 bars gauge
Solvent feed: 5.2 to 13.9 liters/hour
$AlOct_3$: 0.6 to 2.1 mmole/liter
Ethylene absorption rate: 2000 grams/hour
Polymerization rate: 50 grams/liter/hour
$TiCl_3$: 0.05 to 0.08 mmole/liter
Polyethylene concentration: 35% w./w.
Residence time: 5.4 hours The solvent used to form the polymerization medium was an aliphatic hydrocarbon distillate of boiling range 90–110° C. Polymerization was initiated with a suspension of the $TiCl_3$ catalyst component in the solvent to which aluminum tri-octyl had been added as an activator, the $TiCl_3$ and $AlOct_3$ concentrations being within the ranges indicated above. Ethylene and hydrogen were fed to a reactor to maintain a 50:50 v./v. mixture thereof in the reactor at a pressure therein of 6.9 bars (gauge), and when the polyethylene concentration had built up in the reaction medium to 35% w/w., product take-off commenced (with fresh solvent feed to maintain a constant volume of reaction medium) at a rate sufficient to provide an average residence time in the reactor of 5.4 hours. Fresh catalyst component and activator were also fed to the reactor to maintain the concentrations thereof in the reaction medium within the above-stated ranges.

The following Table I shows the results obtained in the various polymerizations carried out. Runs 1 and 2 are comparative experiments employing a Grignard reagent prepared in ether as the sole solvent. Runs 3–10 illustrate the improved results obtained according to the process of the invention utilizing Grignard reagents complexed with controlled amounts of ether.

EXAMPLE V

A titanium trichloride catalyst component was prepared at 100° C. using Grignard reagents L, M and N prepared by reacting n-butyl chloride with magnesium in a solvent medium comprising a petroleum distillate (boiling range 90–110° C.) and triethylamine, tri-n-butylamine and pyridine, respectively, as the complexing agent. Preparation of the Grignard reagents followed the procedure of Grignard reagent C. The amount of tertiary amine was equimolar with respect to the organohalide starting material in each case.

The preparation of the catalyst components (designated O, P, Q from reagents L, M, N, respectively) was carried out at −60° C. in accordance with the procedure of Example I, using a $BuMgCl:TiCl_4$ ratio of 2:1.

Ethylene was then polymerized using each of the catalyst components O, P and Q in turn, polymerization being effected in the manner described in section (a) of Example IV. The results obtained are indicated in the following Table II:

TABLE II

| Grignard reagent | Average specific activity of catalyst [1] | Polyethylene product melt index (grams/ 10 minutes at 2.16 kg., load at 190° C.) |
|---|---|---|
| L | 1.26 | 0.68 |
| M | 1.64 | 0.94 |
| N | 2.02 | 2.3 |

[1] Expressed as in Example IV.

EXAMPLE VI

A catalyst was prepared in the following manner:

A Grignard reagent in the form of the di-n-butyl etherate complex of n-butyl magnesium chloride (containing 2 moles of ether per mole of n-butyl magnesium chloride) was used to reduce titanium tetrachloride at 23° C. using the procedure described in Example III, the ratio of magnesium to titanium being 1.5:1.

Polymerization procedure

Several polymerization runs were carried out in each of which a quantity of hydrocarbon solvent was charged to a reaction vessel equipped with a stirrer, and heated to 80° C. A quantity of triethyl aluminum (0.3 millimole per liter of solvent) or trioctyl aluminum (0.5 millimole per liter of solvent), depending on the polymerization run, was added to the reactor, followed by 0.05 millimole of titanium trichloride prepared as described above. The reactor was then pressured with either hydrogen or ethylene depending on the particular run after which a 50:50 mixture of ethylene and hydrogen was polymerized for 3 hours at 6.9 bars pressure. At the end of the polymerization the solvent was removed from the polymer slurry by steam distillation. The polymer was dried and weighed and its melt flow properties deter-

TABLE I

| Run | Grignard reagent | Ratio of $Bu_2O$ to BuMgCl in the Grignard reagent | Catalyst ($TiCl_3$) component | Method of polymerization | Specific activity of the catalyst,[1] kg./g./hr./ bar $C_2H_4$ | Polyethylene yield in kg./g. of catalyst component | Melt index of polyethylene in grams per 10 min. at 2.16 kg. load at 190° C. |
|---|---|---|---|---|---|---|---|
| 1 | A | 6.6:1 | F | Batch polymerization at atmospheric pressure | 0.2 | 0.130 | (²) |
| 2 | A | 6.6:1 | G | ...do... | 0.2 | 0.130 | (²) |
| 3 | B | 2.3:1 | H | ...do... | 2.28 | 2.0 | 0.17 |
| 4 | B | 2.3:1 | H | Batch polymerization at 6.9 bars | 2.40 | 25.0 | 0.60 |
| 5 | B | 2.3:1 | H | Continuous polymerization at 6.9 bars | 1.16 | 20.4 | 5.8 |
| 6 | C | 1.2:1 | I | Batch polymerization at atmospheric pressure | 4.29 | 2.82 | 0.20 |
| 7 | C | 1.2:1 | I | Batch polymerization at 6.9 bars | 4.17 | 29.0 | 0.36 |
| 8 | C | 1.2:1 | I | Continuous polymerization at 6.9 bars | 1.72 | 30.5 | 4.2 |
| 9 | D | 0.88:1 | J | Batch polymerization at atmospheric pressure | 4.10 | 2.7 | 0.32 |
| 10 | E | 0.70:1 | K | ...do... | 3.7 | 2.42 | 0.40 |

[1] The specific activity of the catalyst is expressed in terms of the amount of polyethylene (in kilograms) produced per gram of $TiCl_3$ catalyst component per hour per bar of ethylene pressure.
² Not determined.

mined. The results of the various runs are set out in Table III.

AlEt₃ concentration in reaction medium: 0.3 millimoles per liter

TABLE III

| Catalyst pretreatment | Co-catalyst | Polymerization medium | Yield Grams | Yield Kg./g. TiCl₃ | Catalyst activity,[1] kg./g./hr./ bar C₂H₄ | Melt index, g./10 min. | Flow parameter [2] |
|---|---|---|---|---|---|---|---|
| Pretreated with 3.5 bars of H₂ for 30 secs. prior to addition of C₂H₄ | AlEt₃ | SBPA[3] | 196 | 12.6 | 1.22 | 0.68 | 1.53 |
| Pretreated with 3.5 bars of C₂H₄ for 30 secs. prior to addition of H₂ | AlEt₃ | | 200 | 12.9 | 1.25 | 0.52 | 1.67 |
| Pretreated with 3.5 bars of H₂ for 30 secs. prior to addition of C₂H₄ | AlOct₃ | | 235 | 15.9 | 1.46 | 0.84 | 1.57 |
| Pretreated with 3.5 bars of C₂H₄ for 30 secs. prior to addition of H₂ | AlCct₃ | | 352 | 22.7 | 2.19 | 0.19 | 1.76 |
| Pretreated with 3.5 bars of H₂ for 30 secs. prior to addition of C₂H₄ | AlEt₃ | Iso-octane | 235 | 15.9 | 1.46 | 1.13 | 1.49 |
| Pretreated with 3.5 bars of C₂H₄ for 30 secs. prior to addition of H₂ | AlEt₃ | | 310 | 20.0 | 1.94 | 0.54 | 1.57 |
| Pretreated with 3.5 bars of H₂ for 30 secs. prior to addition of C₂H₄ | AlOct₃ | | 241 | 15.5 | 1.51 | 0.87 | 1.52 |
| Pretreated with 3.5 bars of C₂H₄ for 30 secs. prior to addition of H₂ | AlOct₃ | | 434 | 28.0 | 2.70 | 0.26 | 1.81 |

[1] Expressed as kilograms of polymer per gram of TiCl₃ per hour per bar pressure of ethylene.
[2] Calculated from the relationship $n = \log A/B$ where A and B are the melt indices in grams/10 minutes determined under applied wieghts of 21.6 and 2.16 kilograms respectively in a Davenport melt indexer (ASTM 1238/577).
[3] An aliphatic hydrocarbon mixture boiling at 90–110° C.

EXAMPLE VII

The procedure described in Example VI was repeated in a reactor operating at a temperature of 50° C. The medium used was iso-octane and the concentration of activator (aluminum trioctyl) was 1.0 mmole/1. The ratio ethylene/hydrogen was 25/75. The results are shown in Table IV.

Ethylene/hydrogen ratio: 50:50 by volume

The ethylene was introduced before the hydrogen.

The various polymerization runs are summarized in the following table. In the polymerizations designated A1, A2 and A3, AlEt₃ was pretreated with water in the form of wet hydrocarbon solvent, while in the polymerizations B and C the TiCl₃ component and the catalyst system

TABLE IV

| Catalyst pretreatment | Yield Grams | Yield Kg./g. TiCl₃ | Catalyst activity, kg./g./hr./ bar C₂H₄ | Melt index, g./10 min. | Flow parameter | Polymerization time/hrs. |
|---|---|---|---|---|---|---|
| Catalyst pretreatment with H₂ at 5.2 bars for 30 secs. prior to addition of C₂H₄ | 165 | 10.65 | 2.47 | 0.33 | 1.73 | 2.5 |
| Catalyst pretreated with H₂ at 5.2 bars for 15 mins. prior to addition of C₂H₄ | 67 | 4.3 | 1.11 | 1.6 | 1.67 | 2.25 |
| Catalyst pretreated with C₂H₄ at 1.7 bars for 30 secs. prior to addition of H₂ | 132 | 8.5 | 3.00 | 0.07 | 1.93 | 1.66 |
| Catalyst pretreated with C₂H₄ at 1.7 bars for 30 secs. prior to addition of H₂ | 71 | 4.58 | 3.19 | 1.83 | 1.90 | 0.83 |

EXAMPLE VIII

A Ziegler catalyst comprising TiCl₃ activated with AlEt₃ was prepared by reducing TiCl₄ with a butyl magnesium chloride/butyl ether complex (containing 2 mols of ether per mol of BuMgCl), suspending the TiCl₃ in a quantity of a solvent consisting of a distillate of boiling range 90–110° C. and adding thereto a solution, in the same solvent, of aluminum triethyl to form an active catalyst dispersion suitable for use as a polymerization reaction medium.

A number of such dispersions were made and used for ethylene polymerizations each carried out under the following conditions:

Polymerization pressure: 6.9 bars
Polymerization time: 3 hours
Polymerization temperature: 80° C.
TiCl₃ concentration in reaction medium: 0.05 millimoles per liter (i.e., the AlEt₃-activated TiCl₃ components, respectively were so treated. For comparative purposes a further polymerization (D) was carried out using AlEt₃-activated TiCl₃ in which no water treatment was involved.

TABLE V

| Polymerization | Amount of water (parts per million) | Average specific activity of catalyst [1] | Polymer properties Melt index, grams/10 mins. | Polymer properties Flow parameter [2] |
|---|---|---|---|---|
| A1 | 5 | 2.15 | 1.15 | 1.60 |
| A2 | 7 | 2.75 | 0.90 | 1.53 |
| A3 | 10 | 0 | | |
| B | 7 | 0.58 | 1.50 | 1.52 |
| C | 5 | 0.76 | 1.02 | 1.60 |
| D | 0 | 1.16 | 1.77 | 1.60 |

[1] The average specific activity of the catalyst is expressed in terms of the amount of polymer obtained in kilograms per gram of TiCl³ per hour per bar pressure of ethylene.
[2] The flow parameter was calculated from the relationship $n = \log A/B$ where A and B are the melt indices in grams/10 minutes determined under applied weights of 21.6 and 2.16 kilograms respectively in a Davenport melt indexer (ASTM 1238/577).

It will be seen from the above table that a catalyst of appreciably greater activity was obtained in runs A1 and A2 in accordance with the present invention. In run A3 the amount of water used in treating the AlEt$_3$ exceeded the critical limit and an inactive catalyst resulted, while in runs B and C the catalysts obtained by effecting water treatment in a manner outside the scope of the invention had activities which were appreciably lower than the reference standard activity of run D.

We claim as our invention:

1. A process for polymerizing alpha-monoolefins of from 2 to 8 carbon atoms per molecule which comprises contacting olefin monomer with a catalyst consisting essentially of (a) a titanium trichloride component prepared by reacting titanium tetrachloride with a reducing organomagnesium composition at a Mg:Ti molar ratio in the range from 1:2 to 3:1, and (b) a trialkyl aluminum wherein each alkyl group has from 2 to 20 carbon atoms, wherein said organomagnesium composition is the reaction mixture formed by reacting magnesium metal with an alkyl halide RX wherein R is an alkyl group of from 4 to 16 carbon atoms and X is halogen in a hydrocarbon solvent and a complexing agent selected from tertiary alkyl amines, dialkyl ethers and cycloalkyl ethers, the amount of complexing agent being of from 0.5 to 2.5 moles per mole of the organomagnesium compound.

2. The process of claim 1 wherein the trialkyl aluminum has from 4 to 16 carbon atoms in each alkyl group.

3. The process of claim 2 wherein the olefin monomer is ethylene or a mixture of ethylene and an alpha-monoolefin of from 3 to 6 carbon atoms and the amount of complexing agent is from 0.8 to 1.5 moles per mole of the organomagnesium compound.

4. The process of claim 2 wherein the complexing agent is a di-n-alkyl ether.

5. The process of claim 4 wherein the complexing agent is a diethyl ether or di-n-butyl ether.

6. The process of claim 2 wherein the complexing agent is a tertiary n-alkyl amine.

7. The process of claim 6 wherein the amine is triethyl amine or tri-n-butyl amine.

8. The process of claim 2 wherein the catalyst is pretreated with the olefin monomer or with hydrogen.

9. The process of claim 2 wherein the polymerization is carried out in two sequential polymerization steps carried out in the same polymerization zone or in different polymerization zones.

10. The process of claim 2 wherein the aluminum trialkyl has been contacted with up to substantially an equimolar amount of water, based on aluminum trialkyl.

References Cited

UNITED STATES PATENTS

| | | | |
|---|---|---|---|
| 2,954,367 | 9/1960 | Vandenberg | 260—94.9 E |
| 3,058,963 | 10/1962 | Vandenberg | 260—94.9 E |
| 3,116,274 | 12/1963 | Boehm et al. | 260—94.9 C |
| 3,242,099 | 3/1966 | Manyik et al. | 260—94.9 E |
| 3,558,271 | 1/1971 | Calcagno | 260—94.9 C |
| 2,905,645 | 9/1959 | Anderson et al. | 260—94.9 B |
| 3,070,549 | 12/1962 | Ziegler et al. | 260—94.9 B |
| 3,058,970 | 10/1962 | Rust et al. | 260—94.9 E |
| 3,299,026 | 1/1967 | Lang | 260—94.9 E |

FOREIGN PATENTS 2,003,075   7/1970   Germany.

JOSEPH L. SCHOFER, Primary Examiner

E. J. SMITH, Assistant Examiner

U.S. Cl. X.R.

252—429 B, 429 C; 260—93.7, 94.9 C, 94.9 E